March 2, 1971  K. J. WILLIAMS  3,566,477
MEASURING INSTRUMENT

Filed April 16, 1968  5 Sheets-Sheet 1

INVENTOR.
KENNETH JAMES WILLIAMS,
BY HOPGOOD & CALIMAFDE.
ATTORNEY.

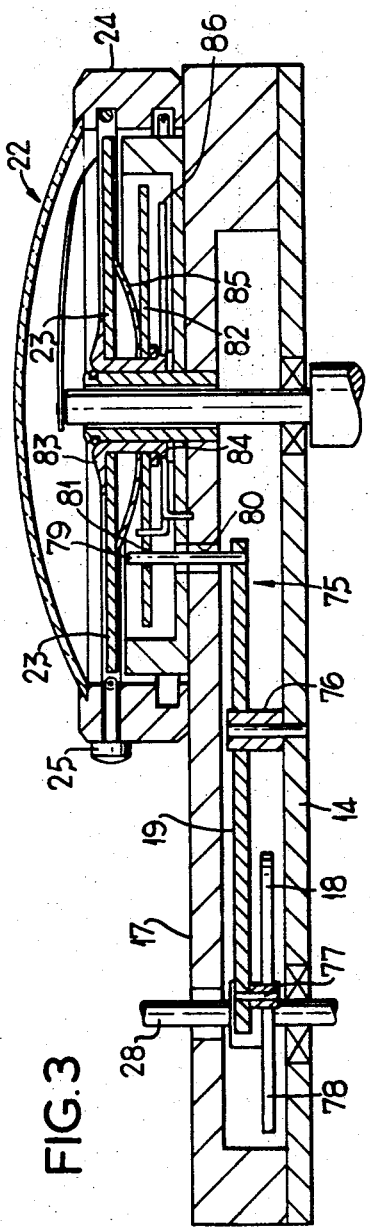

March 2, 1971  K. J. WILLIAMS  3,566,477
MEASURING INSTRUMENT
Filed April 16, 1968  5 Sheets-Sheet 4
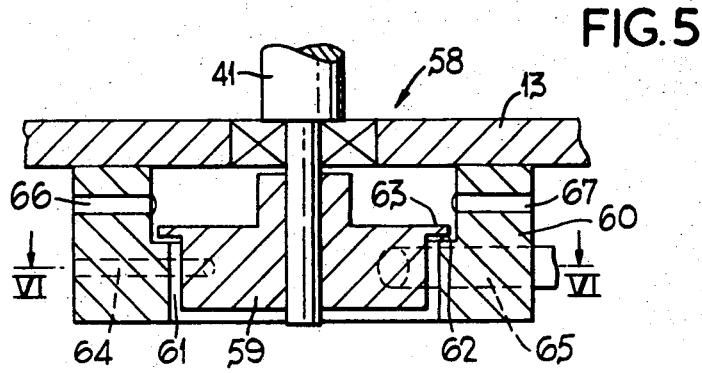
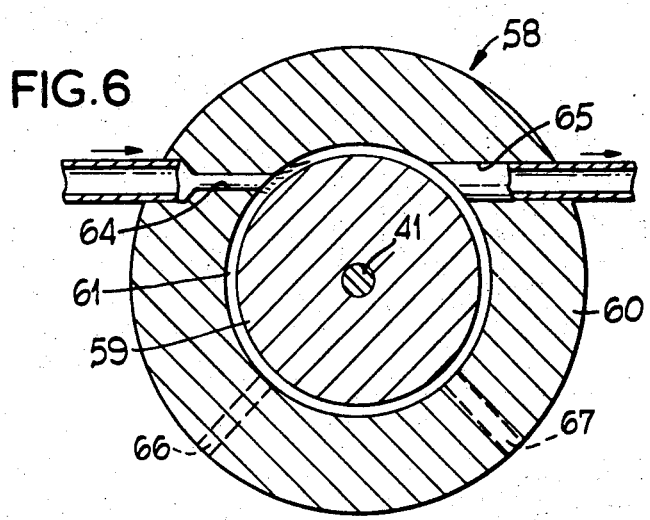
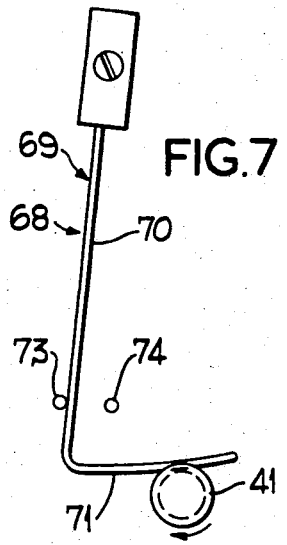
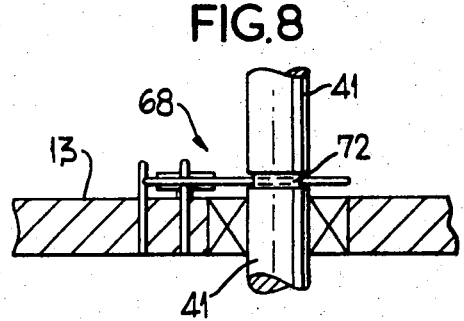
INVENTOR.
KENNETH JAMES WILLIAMS.
BY HOPGOOD & CALIMAFDE.
ATTORNEY.

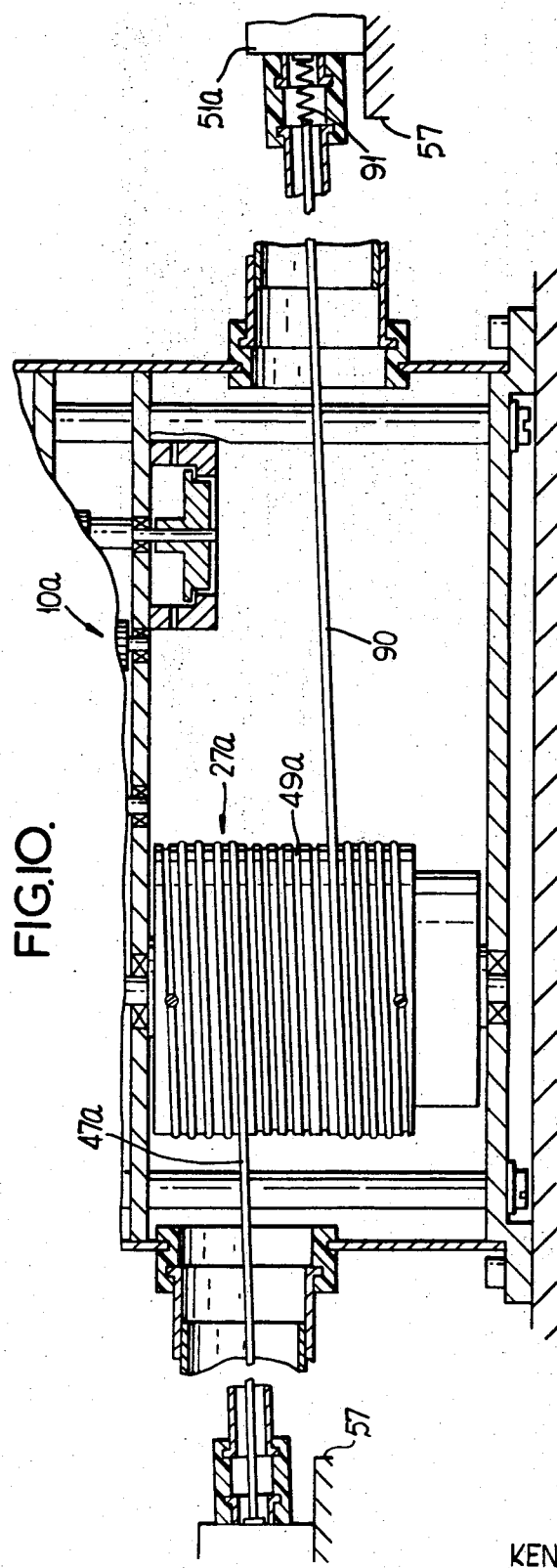

United States Patent Office 3,566,477
Patented Mar. 2, 1971

3,566,477
MEASURING INSTRUMENT
Kenneth James Williams, 31 Hillcrest Gardens,
Hinchley Wood, Surrey, England
Filed Apr. 16, 1968, Ser. No. 721,866
Claims priority, application Great Britain, Apr. 19, 1967,
18,013/67; July 18, 1967, 32,904/67; Sept. 26, 1967,
43,793/67
Int. Cl. G01b 5/02
U.S. Cl. 33—125                                    6 Claims

ABSTRACT OF THE DISCLOSURE

A measuring instrument comprising a drum and a wire or tape, one end of which is attached to the drum and the other end of which is attached to a member which is movable relative to the drum. The drum is spring urged to rotate the drum about its axis in a sense to wind the wire or tape on to the drum and rotation of the drum is indicated through a gear train on a series of dials. The wire or tape is wound on to a helical track on the surface of the drum, the angle of the wire to the horizontal is constant and equal to the track helix angle throughout winding of the wire or tape on and off the drum and the end of the wire fixed to the member moves in a fixed plane.

BACKGROUND TO THE INVENTION

Optical measuring instruments for use on machine tools are known. These can be highly accurate but they are generally very costly to manufacture and hitherto the cheaper, mechanical instruments have not given a high degree of accuracy.

Known mechanical instruments in general, rely upon a gear train to indicate the distance measured on a series of dials driven from the gears and substantial inaccuracies inevitably occur in the reading on the dials as a result of wear or unevenness in the shaft bearings or in the gears themselves. In one known instrument the gear train is actuated by the axle of a wheel fixed to one member and running on a track fixed to the other member. This method has the further disadvantage that inaccuracies occur if the wheel is not correctly aligned or if any dirt accumulates on the track or on the wheel.

It is therefore an object of the present invention to provide a measuring instrument which is cheap to manufacture and which provides a very high degree of accuracy although it is mechanical in its operation and relies upon a gear train.

SUMMARY OF THE INVENTION

According to the invention, there is provided a measuring instrument comprising a cylindrical drum mounted for rotation on a main shaft, means for indicating the rotation of the drum about its own axis, a flexible elongate member, one end of which is attached to the drum and the other end of which is attached to a member spaced from the drum, the member and the drum being relatively movable and the elongate member being windable onto the drum on a helical track, wherein the drum is spring biased in a direction to wind the elongate member on to the drum and the angle of inclination of the elongate member to the horizontal remains constant and equal to the angle of the helical track on the drum.

Figure 1:
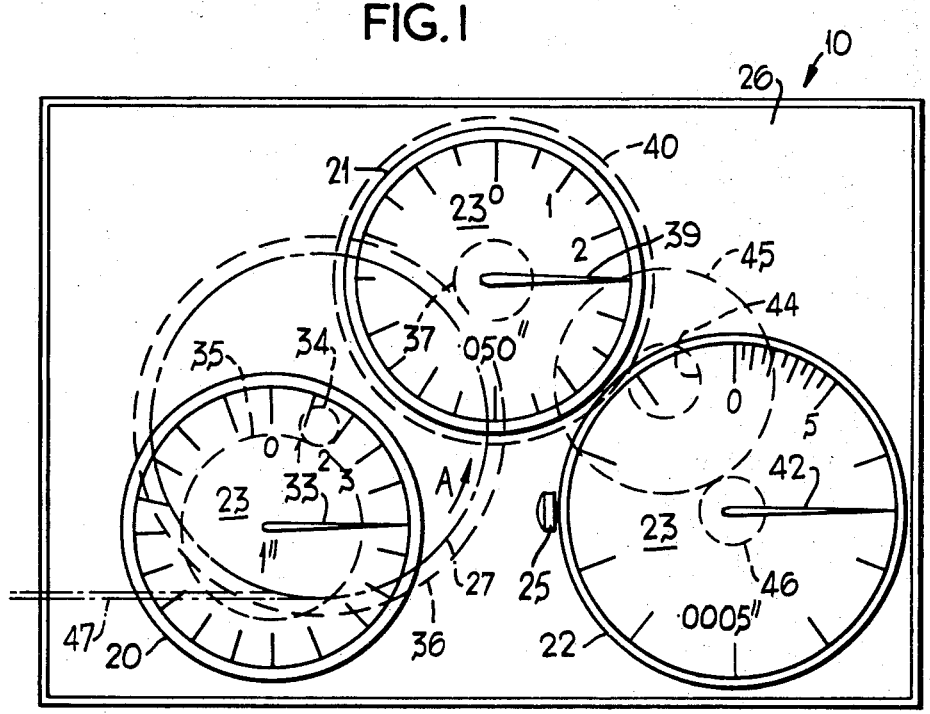
Figure 4:
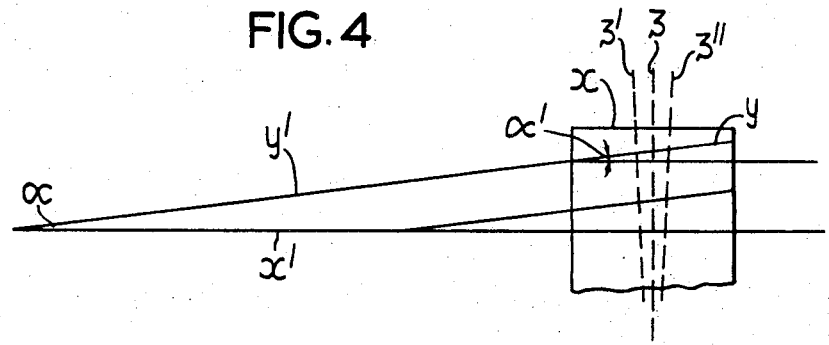
Figure 2:
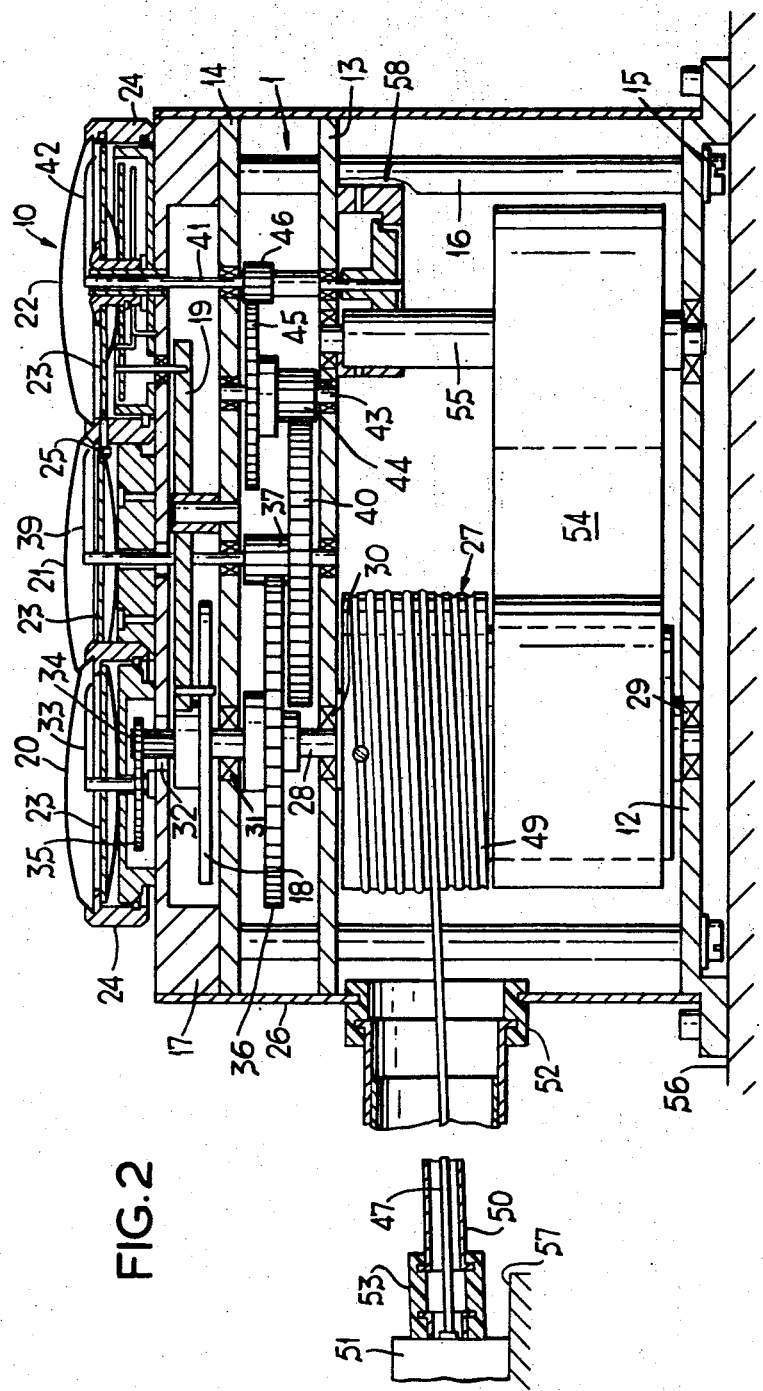

Preferred forms of the invention will now be described with reference to the accompanying diagrammatic drawings, in which:

FIG. 1 is a plan view of a measuring instrument according to the invention,

FIG. 2 is an elevation of the instrument of FIG. 1 with the side wall of the housing removed and partly in section for better illustration, FIG. 3 is an elevation, partly in section and on an enlarged scale, of a detail of FIG. 2, FIG. 4 is a diagrammatic illustration of the instrument of FIGS. 1 to 3, FIG. 5 is a section, on an enlarged scale, through a detail of FIG. 2, FIG. 6 is a section on the line VI—VI of FIG. 5, FIG. 7 is a plan vew on an enlarged scale of a modification to a detail of FIG. 2, FIG. 8 is an elevation of FIG. 7, FIG. 9 is a plan view of a detail of FIG. 3 and FIG. 10 is a view similar to FIG. 2 of a part of a modification of the instrument shown in FIG. 2.

In FIGS. 1 and 2 a measuring instrument is indicated generally at 10. The measuring instrument 10 comprises a framework 11 comprising a lower panel 12, an intermediate panel 13 and an upper panel 14, which are bolted together by bolts 15 and spacers 16. Attached to the upper face of the upper panel 14 is a housing 17 for a cam disc 18 and lever 19 of an error compensating device, which will be described in detail below.

On the upper face of the housing 17 are first, second and third dials 20, 21 and 22 respectively each of which comprises a rotatable dial face 23 and a knurled dial housing 24 which is manually rotatable to adjust the angular position of the dial counter. The third dial 22 which is shown in detail in FIG. 3, differs from the first and second dials 20 and 21 in that the dial face 23 of the third dial 22 is not normally fixed to the dial housing 24 but can be manually linked to the housing 24 for rotation therewith by a spring-loaded dial face reset button 25. A cover 26 comprising separate side is fitted over the framework 11 and the dials 20, 21, 22 are mounted on the upper surface of the housing 17.

A cylindrical drum 27 is positioned between the lower panel 12 and the intermediate panel 13 and is mounted on a vertical main shaft 28 which is journalled in bearings 29, 30 and 31 in the panels 12, 13, 14 and the upper end of which extends through a clearance hole 32 in the housing 17. The main shaft 28 drives a first pointer 33 of the first dial 20 through a pinion 34 and gear wheel 35. Fixed to the main shaft 28 and located between the intermediate panel 13 and upper panel 14 is a gear wheel 36, which meshes with a pinion 37 on a shaft 38. The shaft 38 carries a second pointer 39 for the second dial 21 and also a gear wheel 40. A shaft 41 carrying a third pointer 42 for the third and final dial 22 is driven from the gear wheel 40 through an intermediate shaft 43, which carries a pinion 44, and a gear wheel 45. The gear 45 meshes with a pinion 46 on the shaft 41. The dial faces 23 of the three dials are calibrated in the normal manner and the ratios of the gear train driving the shafts 28, 38 and 41 are arranged to give the required fractional measurement ratios on the dial faces.

The measuring instrument 10 also includes a wire 47, one end of which is attached, at 48 to the upper end of the drum 27. The wire 47 is wound onto a helical track 49 in the form of a groove which is performed in the surface of the drum and its outer end extends outwardly from the drum through a telescopic sheath 50 and is fixed to a bracket 51. The sheath 50 is attached by resilient mountings 52 and 53 between the bracket 51 and the cover 26 and encases the wire 47 without touching it at any point.

A flat coil spring 54 is attached between the lower end of the drum 27 and a shaft 55, which is journalled between the lower panel 12 and the intermediate panel 13. The spring 54 is a flat coil spring and imparts a permanent rotational force to the drum 27, in the direction of the arrow $a$ of FIG. 1. Preferably, the spring 54 is of a type which gives an approximately uniform torque throughout its length. A suitable spring is that sold under the registered trade mark Tensator.

In use, the framework 11 of the measuring instrument 10 is attached to a stationary part 56 of a machine tool and the bracket 51 is attached to a moving part 57 of the tool so that the wire 47 is parallel to the direction of movement of the moving part 57. This arrangement can be reversed if required and the bracket 51 attached to the stationary part. Relative movement of the two parts of the tool causes the drum 27 to rotate, in one sense under the action of the spring 54 and in the other sense under a pull exerted by the wire 47, and rotation of the drum in either sense is indicated, through the gears, on the dials 20, 21 and 22 by the pointers 33, 39 and 42 respectively. Movement of the part 57 of the machine tool is thus measured and indicated on the dials 20 to 22.

The bracket 51 is attached to the moving part 57 at such a height that the wire is aligned with the helical track 49 at all times. In FIG. 4, the wire and drum are shown diagrammatically. The angle $\alpha^1$ of the wire to the horizontal is equal to the angle $\alpha$, of the helix and as the wire is wound on or off the drum the angle $\alpha^1$ remains constant. Preferably, the circumference $x$ of the drum is an easily divisible length, say five inches. The length $y$ of one turn of the helix will be slightly greater than the circumference $x$; and, the length $y'$ of wire wound onto the drum by one full turn of the drum will equal the circumference of the helix $y$. However, as can be seen from FIG. 4, provided the angle $\alpha^1$ is maintained equal to the angle $\alpha$ of the helix, the distance $x'$ traveled by the moving part 57 for one full turn of the drum will equal the length $x$ of the circumference of the drum and not the length $y$ of the helix.

In order to obtain a high degree of accuracy with the measuring instrument 10 it is necessary for the length of the circumference of the drum to be exact. Normal manufacturing tolerances preclude this but any inaccuracy in the drum circumference can be compensated by tilting the axis $z$ of the drum, such as by raising one end of lower panel 12 within a vertical plane parallel to the wire towards or away from the outer end of the wire into the position $z'$ and $z''$. If the circumference of the drum is slightly greater than required, the drum is tilted into the position $z''$ to increase the distance moved by the part 57 for each full turn of the drum. Alternatively, the drum is tilted in the opposite sense into the position $z'$ to decrease the distance which the part 57 moves for a full turn of the drum. The extent of the inclination of the axis of the drum which is required to compensate for an error in the drum circumference can be found by trial and error.

Inaccuracy can also occur in the reading given on the last dial 22 as a result of backlash occurring in the gears and this is eliminated or substantially reduced by an anti-backlash device 58, which is shown in detail in FIGS. 5 and 6. It can be seen from FIG. 2, that the shaft 41, which carries the pointer 42 of the last dial 22, extends through the intermediate panel 13 and below the panel 13, carries a disc 59, which is surrounded by an annular housing 60. The housing 60 is mounted on the undersurface of the panel 13 and is spaced from the disc 59, thereby forming an annular gap 61 between the housing and the disc. The internal surface of the housing 60 is formed with a step 62 and the disc is formed with a flange 63 which overlies, but is spaced fractionally from the step 62. The annular wall of the housing 60 has an inlet 64 and an outlet 65 opening into the annular gap 61 and, positioned above the flange 63 on the disc are additional exhaust outlets 66 and 67. When the measuring instrument 10 is in use air under pressure is fed to the inlet 64. The compressed air passes from the inlet into the annular gap 61 where it strikes the outer surface of the disc 59 tangentially creating a rotational force which urges the shaft 41 in its normal forward direction of rotation and resists any backlash movement set up in the gears. The compressed air escapes through the exhaust outlet 65 and any pressure which builds up above the disc 59 is released through the additional exhaust outlets 66 and 67.

An alternative anti-backlash device is indicated generally at 68 in FIGS. 7 and 8. The device 68 comprises an L-shaped wire spring 69 comprising a stem portion 70 the end of which is pivoted on the upper surface of the plate 13 and a curved arm portion 71 which bears against the shaft 41. The shaft 41 is modified and formed with an annular groove 72 which is located above the panel 13 and the arm portion 71 of the spring bears against the base of the groove 72. Pivoting movement of the spring 69 is limited by pins 73 and 74 which project upwardly from the panel 13. In its equilibrium position, the stem portion 70 of the spring is located mid-way between the pins 73 and 74. If the shaft 41 is then rotated clockwise, with reference to FIG. 7, the spring 69 is driven against the pin 74. The stem portion 70 of the spring is then bowed slightly and thereafter slip occurs between the spring and the shaft. The bowing of the stem portion 70 creates a store of energy in the spring and, when the load on the gears is removed, the spring will rotate the shaft, in the opposite sense, through the extent of the backlash. Consequently, subsequent rotation of the shaft in the opposite sense, however small the extent of the movement, will register positively on the dial and will not occur through the backlash area.

Two further causes of inaccuracy in the reading obtained by the measuring instrument 10 are unevenness in the bearings and in the gears themselves. Inaccuracy resulting from either of these causes are compensated by an error compensating device 75, which is shown in detail in FIGS. 3 and 9.

The compensating device 75 which is located within the housing 17 comprises the cam disc 18 and the lever 19 referred to above. The cam disc 18 is attached to the main shaft 28 and the lever 19 is pivoted at 76 on the panel 14. A cam follower 77 on one end of the lever 19 bears against the cylindrical, peripheral face 78 of the cam 18 and a pin 79 projects upwardly from the other end of the lever 19 through a slot 80 in the housing 17 and into a slot 81 in a disc 82, which is connected to the dial counter 23 of the dial 22 for rotation therewith. The dial counter 23 and disc 82 are attached to a bush 83 by a circlip 84 and a friction washer 85 is clamped between the dial counter 23 and the disc 82. The bush 83 is located over a bearing for the shaft 41 and is retained by a circlip. The dial counter 23 normally moves with the disc 82, but if the disc is held, then the counter 23 can be moved manually, relative to the disc 82 by pressing button 25 inwardly against the counter 23 and applying a rotational force sufficient to overcome the friction of the washer 85. The disc 82 is permanently spring urged in an anti-clockwise direction with reference to FIG. 9, by a C-spring 86. The spring 86, which has one end located in an aperture in the disc 82 and the other end located in an aperture in the housing 17, urges an edge 87 of the slot 81 in the disc against the pin 79 on the lever 19 thereby holding the cam follower 77 at the other end of the lever firmly against the face 78 on the cam disc 18.

When the main shaft 28 is rotated the cam follower 77 runs on the face 78 and the contour of the face, operating through the lever 19 moves the disc 82 and the dial counter 23. Thus, by tracing the inaccuracies in the gears over a 360° rotation of the main shaft and milling the face 78 with corresponding indentations and rises, the final dial counter 23 can be moved relative to the pointer 42 to compensate for the inaccuracies and thus give a true reading.

It has been found in practice that the measuring instrument 10, provided with a drum having a circumference of 5 inches will repeat accurately to within four ten-thousandths of an inch over a measuring range of 25 inches.

Preferably, the drum is made from a material which is not affected by temperature changes. A suitable material of this type is that sold under the registered trademark Invar. Changes in the diameter of the wire do not affect the accuracy of the instrument unless the change takes place during a measuring operation, and the measuring instrument 10 is thus, for practical purposes not affected by changes in the ambient temperature.

In a modification of the measuring instrument 10, shown at 10a in FIG. 10 the flat spring 54 is replaced by a secondary wire 90 and coil spring 91. In the instrument 10a, the drum 27a is formed with a helical track 49a which extends over the whole length of the drum. One end of the secondary wire 90 is attached to the drum 27a at 92, approximately four turns below the point at which the primary wire 47a leaves the drum. The other, outer end of the secondary wire is attached to the coil spring 91 which is, in turn attached to a bracket 51a mounted on the moving part 57. The secondary wire 90 and spring 91 bias the drum 27a in an anti-clockwise direction to wind the primary wire 47a on to the drum. Thus, as the primary wire 47a winds on to the drum the secondary wire 90 winds off and vice versa.

The secondary wire 90 is sheathed in the same manner as the primary wire and serves the same purpose as the flat spring 54 in the instrument 10.

If necessary the measuring instrument 10 can be adapted to give a digital reading by replacing the pointer 42 on the shaft 41 with a well known form of digital disc and providing two, angularly spaced photo-electric cells on the disc 82. Rotation of the digital disc, which is formed with a series of angularly spaced slots creates a series of signals from the photo-electric cells which are transmitted to a signal reader positioned above the digital disc.

The above description relates to the preferred embodiments of my invention and is not to be interpreted as limiting the scope of my invention.

What I claim is:
1. A measuring instrument comprising a main shaft, a cylindrical drum having a helical track thereon and mounted for rotation on said main shaft, means for indicating the rotational position of said drum about its own axis, a part spaced from said drum, a flexible first elongate member, one end of said first elongate member being attached to said drum and its other end being attached to said part, said part and said drum being relatively movable and said first elongate member being windable onto said drum on said helical track, means for biasing said drum in a direction to wind said first elongate member on said drum, said biasing means comprising spring means mounted on said part, and a second elongate member one end of which is attached to said drum and the other end of which is attached to said spring, said second elongate member being windable onto said helical track as said first elongate member is wound off said helical track and vice versa, the angle of inclination of said first and second elongate members with respect to the horizontal being substantially constant and equal to the angle of said helical track on said drum, whereby said second elongate member extends outwardly from said drum in the opposite direction to said first elongate member, whereby the forces exerted on said main shaft by said first and second elongate members are substantially equalized.

2. An instrument as claimed in claim 1, wherein the first and second elongate members are housed in longitudinally collapsible sheaths.

3. An instrument as claimed in claim 1 further comprising a dial including a rotatable pointer and a calibrated dial face, and an error compensating device, including a cam disc attached to the main shaft and a lever, one end of which is actuated by variations on the face of the cam disc and the other end of which rotates the dial face in response to the variations of the cam disc.

4. An instrument as claimed in claim 3, further comprising a gear train, wherein a second shaft is connected to said gear train and carrying the pointer on said dial, and a spring frictionally engaged against said second shaft in a manner such that rotation of said shaft in either sense by a given rotational force tensions said spring, whereby said spring rotates said second shaft in the opposite sense when said force is removed through the area of play in said gear train.

5. An instrument as claimed in claim 3, wherein the pointer on the dial is mounted on a shaft, which is connected to a gear train and which is permanently urged in one angular sense to prevent play in the pointer resulting from backlash in the gear train.

6. An instrument as claimed in claim 5, wherein a friction disc is mounted on the said second shaft and a stream of compressed air is directed tangentially against the friction disc to permanently urge the shaft in the said one angular sense.

References Cited
UNITED STATES PATENTS

| 2,276,302 | 3/1942 | Guttmann | 33—125 |
| 2,293,730 | 9/1942 | Guttmann | 33—125 |
| 2,293,733 | 9/1942 | Guttmann | 33—125 |
| 2,448,473 | 9/1948 | Shrewsbury | 33—125 |
| 2,583,371 | 1/1952 | Guttmann | 33—125 |
| 2,919,682 | 1/1960 | Chien-Bor Sung | 74—409 |

FOREIGN PATENTS

| 1,200,500 | 1959 | France | 33—161 |
| 518,643 | 1955 | Canada | 33—161 |

LEONARD FORMAN, Primary Examiner

D. A. DEARING, Assistant Examiner

U.S. Cl. X.R.

33—139, 172

UNITED STATES PATENT OFFICE
CERTIFICATE OF CORRECTION

Patent No. 3,566,477              Dated March 2, 1971

Inventor(s)  Kenneth James Williams

It is certified that error appears in the above-identified patent and that said Letters Patent are hereby corrected as shown below:

Column 6, line 31, after "a" insert -- second --.

Signed and sealed this 17th day of August 1971.

(SEAL)
Attest:

EDWARD M. FLETCHER, JR.　　　　　　　　WILLIAM E. SCHUYLER, JR
Attesting Officer　　　　　　　　　　　Commissioner of Patents